(12) United States Patent
Xiao

(10) Patent No.: US 12,401,887 B2
(45) Date of Patent: Aug. 26, 2025

(54) PHOTOGRAPHING METHOD AND APPARATUS AND ELECTRONIC DEVICE

(71) Applicant: VIVO MOBILE COMMUNICATION CO., LTD., Guangdong (CN)

(72) Inventor: Xu Xiao, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 175 days.

(21) Appl. No.: 18/355,288

(22) Filed: Jul. 19, 2023

(65) Prior Publication Data

US 2023/0362476 A1 Nov. 9, 2023

Related U.S. Application Data

(63) Continuation of application No. PCT/CN2022/073172, filed on Jan. 21, 2022.

(30) Foreign Application Priority Data

Jan. 22, 2021 (CN) .......................... 202110088005.4

(51) Int. Cl.
*H04N 23/63* (2023.01)
*H04N 23/60* (2023.01)

(52) U.S. Cl.
CPC ........... *H04N 23/63* (2023.01); *H04N 23/665* (2023.01)

(58) Field of Classification Search
CPC ...... H04N 23/63; H04N 23/665; H04N 23/80; H04N 23/60; H04N 23/62; H04N 23/631; H04N 23/632
See application file for complete search history.

(56) References Cited

U.S. PATENT DOCUMENTS

| 6,522,359 B1 | 2/2003 | Yamashita | |
|---|---|---|---|
| 2004/0070679 A1* | 4/2004 | Pope | H04N 1/2112 386/E5.072 |

(Continued)

FOREIGN PATENT DOCUMENTS

| CN | 102801884 A | 11/2012 |
|---|---|---|
| CN | 105516423 A | 4/2016 |
| CN | 106453834 A | 2/2017 |

(Continued)

OTHER PUBLICATIONS

CN Office Action dated Dec. 29, 2021 as received in Application No. 202110088005.4.

(Continued)

*Primary Examiner* — Yogesh K Aggarwal

(74) *Attorney, Agent, or Firm* — Price Heneveld LLP

(57) ABSTRACT

A photographing method and apparatus and an electronic device, and relates to the technical field of electronic devices are provided. The method includes: receiving a first photographing request instruction input by a user; performing image processing on at least one captured first original image in response to the first photographing request instruction; receiving, within a target duration, a second photographing request instruction input by the user, where the target duration is a duration for performing image processing on the at least one first original image; and performing image processing on at least one captured second original image in response to the second photographing request instruction.

17 Claims, 4 Drawing Sheets

(56) References Cited

U.S. PATENT DOCUMENTS

2011/0261228 A1\* 10/2011 Peng ...................... H04N 23/64
                                                           348/E5.062
2012/0300264 A1    11/2012 Okumura et al.

FOREIGN PATENT DOCUMENTS

| CN | 109688321 A | 4/2019 |
| CN | 109922322 A | 6/2019 |
| CN | 110719409 A | 1/2020 |
| CN | 111526288 A | 8/2020 |
| CN | 112770059 A | 5/2021 |
| WO | 2017/107629 A1 | 6/2017 |

OTHER PUBLICATIONS

International Search Report and Written Opinion of the International Searching Authority dated Mar. 23, 2022 as received in Application No. PCT/CN2022/073172.

\* cited by examiner

PHOTOGRAPHING METHOD AND APPARATUS AND ELECTRONIC DEVICE

CROSS-REFERENCE TO RELATED APPLICATIONS

The present application is a continuation application of International Application No. PCT/CN2022/073172 filed on Jan. 21, 2022, which claims priority to Chinese Patent Application No. 202110088005.4, filed on Friday, Jan. 22, 2021 in China, which is incorporated herein by reference in its entirety.

TECHNICAL FIELD

The present application belongs to the technical field of electronic devices, and in particular, relates to a photographing method and apparatus and an electronic device.

BACKGROUND

Today, with the increasing development of smart phones, the photographing experience has become a very important factor for users to purchase electronic products. Both photographing effect and photographing performance are the focus of users' attention. In most cases, these two factors are mutually contradictory. A current photographing process is: a camera application program can click on next photographing after receiving joint photographic experts group (JPEG) data carried in a previous photographing request response message. The whole photographing process needs to include an image processing process. That is: only when the camera application program receives a target image, the current photographing process ends, and the user can start a next photographing process. The higher the pixel of the image, the longer the time required for image processing. This prolongs the photographing time, and for users who want to photograph quickly, the user experience is very poor.

SUMMARY

The purpose of the embodiments of the present application is to provide a photographing method and apparatus and an electronic device.

According to a first aspect, an embodiment of the present application provides a photographing method, the method including:
  receiving a first photographing request instruction input by a user;
  performing image processing on at least one captured first original image in response to the first photographing request instruction;
  receiving, within a target duration, a second photographing request instruction input by the user, where the target duration is a duration for performing image processing on the at least one first original image; and
  performing image processing on at least one captured second original image in response to the second photographing request instruction.

According to a second aspect, an embodiment of the present application provides a photographing apparatus, including:
  a first receiving module configured to receive a first photographing request instruction input by a user;
  a first image processing module configured to perform image processing on at least one captured first original image in response to the first photographing request instruction;
  a second receiving module configured to receive, within a target duration, a second photographing request instruction input by the user, where the target duration is a duration for performing image processing on the at least one first original image; and
  a second image processing module configured to perform image processing on at least one captured second original image in response to the second photographing request instruction.

According to a third aspect, an embodiment of the present application further provides an electronic device, where the electronic device includes a processor, a memory, and a program or an instruction that is stored in the memory and that can run on the processor, and when the program or the instruction is executed by the processor, the steps of the method according to the first aspect are implemented.

According to a fourth aspect, an embodiment of the present application further provides a readable storage medium, where the readable storage medium stores a program or an instruction, and when the program or instruction is executed by a processor, the steps of the method according to the first aspect are implemented.

According to a fifth aspect, an embodiment of the present application provides a chip. The chip includes a processor and a communication interface. The communication interface is coupled to the processor. The processor is configured to run a program or instructions to implement the method according to the first aspect.

According to a sixth aspect, an embodiment of the present application provides a computer program product stored in a nonvolatile storage medium, and the computer program product is executed by at least one processor to implement steps of the method according to the first aspect.

DESCRIPTION OF EMBODIMENTS

The following clearly and completely describes the technical solutions in the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art without creative efforts fall within the protection scope of the present application.

The terms "first", "second", and the like in the description and the claims of the present application are used to distinguish between similar objects, and do not need to be used to describe a specific order or sequence. It should be understood that data used in this way may be interchangeable in appropriate cases, so that the embodiments of the present application can be implemented in a sequence other than those shown or described herein. In addition, in the specification and the claims, "and/or" represents at least one of connected objects, and a character "/" generally represents an "or" relationship between associated objects.

The photographing method and apparatus and electronic device provided by the embodiments of the present application will be described in detail below through specific embodiments and application scenarios with reference to the accompanying drawings.

The method in the embodiments of the present application is applied to an electronic device, and the electronic device may be a mobile electronic device or a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not specifically limited in this embodiment of the present application.

Figure 1:
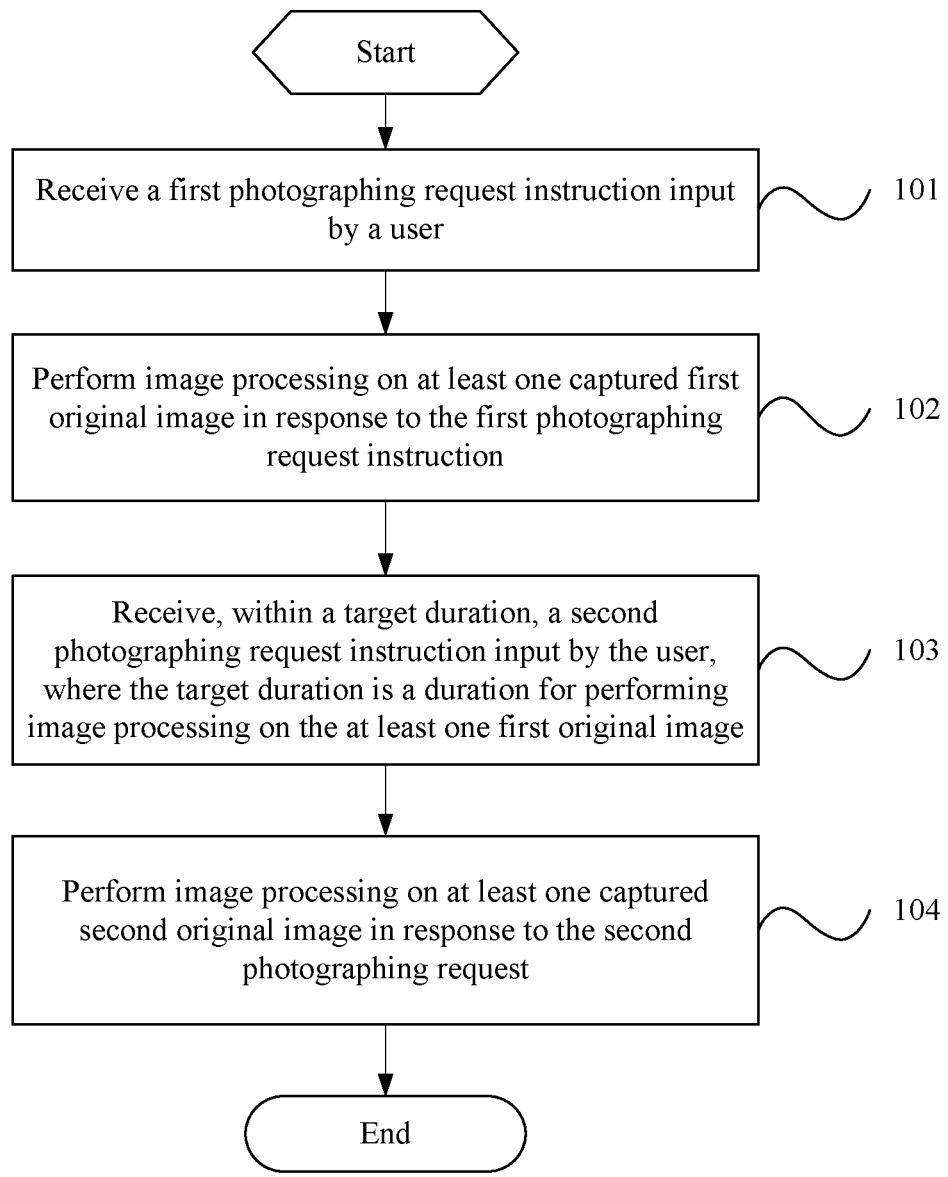
FIG. 1 is a first schematic flowchart of a photographing method of an embodiment of the present application.

FIG. 1 is a first schematic flowchart of a photographing method of an embodiment of the present application. The method includes:

Step 101: Receive a first photographing request instruction input by a user.

In this step, specifically, the camera application program of the electronic device may receive a photographing request instruction input by the user, where the camera application program may monitor and receive in real time the photographing request instruction input by the user. The photographing request instruction includes but is not limited to: a pressing operation of a preset physical key, a preset sound, a touch operation on a specific area of the touch screen, an operation on a preset key combination, and the like.

Step 102: Perform image processing on at least one captured first original image in response to the first photographing request instruction.

Specifically, after the camera application program receives the first photographing request instruction input by the user, the camera application program sends a photographing request to the camera processing unit in response to the first photographing request instruction, and after the camera processing unit receives the first photographing request instruction, the camera processing unit first obtains at least one first original image captured by the image sensor, or extracts a pre-captured preview image in the cache; that is, the at least one first original image in this step can be the original image captured by the image sensor in response to the first photographing request instruction, and may also be an original image pre-captured by the image sensor and stored in the cache; and then sends the at least one first original image to an image signal processor (ISP), and finally, controls the ISP to perform image processing on the at least one first original image to obtain the target image; or uses a Raw domain algorithm to process the indicated first original image to obtain the target image.

Step 103: Receive, within a target duration, a second photographing request instruction input by the user, where the target duration is a duration for performing image processing on the at least one first original image.

In this step, during the image processing process of the at least one original image by the camera processing unit, the camera application program can also receive the user's second photographing request instruction, realizing the parallel implementation of the image processing and the user's second photographing operation. This shortens the time interval between the user's two adjacent photographing actions, realizes quick photographing, and improves the user's photographing experience.

Step 104: Perform image processing on at least one captured second original image in response to the second photographing request instruction.

Herein, it should be noted that, in this step, the image processing of the at least one captured second original image may be performed after the image processing of the at least one first original image is completed, or in the processing of processing the at least one first original image; that is, the processing of at least one first original image and the processing of at least one second original image may be performed in parallel, for example: while performing Yuv domain algorithm processing on at least one first original image, the Raw domain algorithm processing is performed on at least the second original image; or the two processing may also be performed sequentially. Yuv is a color coding method.

In the photographing method in the embodiments of the present application, firstly, the first photographing request instruction input by the user is received, secondly, image processing is performed on the at least one captured first original image in response to the first photographing request instruction, to obtain the target image; and then, the second photographing request instruction input by the user is received within the target duration, where the target duration is the duration for performing image processing on the at least one first original image. In this way, image processing is performed in the background, so that in each photographing process, image processing occupies a shorter time. Finally, in response to the second photographing request instruction, image processing is performed on the at least one captured second original image. Therefore, in the process of image processing in the background, the next photographing request instruction of the user can be received, which greatly improves the performance of quick photographing and improves the user experience without affecting the effect of pictures.

Herein, it should be noted that in step 102, the photographing request delivered by the camera application to the camera processing unit carries relevant information for determining a number of original images used to generate the target image, and the camera processing unit sends the original image to the ISP according to the relevant information. The relevant information may include: a photographing mode selected by the user and an initial image processing algorithm determined by the image sensor according to a collected current environmental parameter, but is not limited thereto. The camera processing unit determines a final image processing algorithm according to the photographing mode and the initial image processing algorithm, so as to determine a currently required number of first original images according to a preconfigured correspondence between the image processing algorithm and the number of images.

Optionally, step 102 of performing image processing on at least one captured first original image in response to the first photographing request instruction includes:

a) sending a first photographing response instruction to a camera application program in a case that a camera processing unit sends the at least one first original image to an image signal processor ISP.

In this step, on the one hand, the first photographing response instruction is used to instruct the camera application program to terminate the current photographing process; on the other hand, after the camera processing unit sends the at least one first original image to the image signal processor ISP, the camera processing unit sends the first photographing response instruction to the camera application program. In this way, firstly, the camera processing unit can control the ISP to process the at least one first original image in the background to obtain the target image currently photographed; secondly, the camera application program is instructed to terminate (release) the current photographing process, so that the camera application program can accept a photographing request instruction of the user again. In this way, image processing and receiving a photographing action of the user are performed in parallel. On the basis of ensuring the photographing effect, a time for the user to perform two adjacent photographing operations is shortened, quick photographing is implemented, and the photographing experience of the user is improved.

b) controlling the ISP to perform image processing on the received at least one first original image.

Herein, the Yuv algorithm is used as an example, and the image processing process of this step is specifically described:

(A) The camera processing unit controls the ISP to process the at least one first original image in the received Raw format by using the Yuv algorithm to obtain multi-frame data in the Yuv format.

(B) The camera processing unit receives the multi-frame data in the Yuv format generated by the ISP, and performs Yuv-domain multi-frame noise reduction on the multi-frame data in the Yuv format to obtain one frame of data in the Yuv format. Herein, the multi-frame noise reduction algorithm is explained: In a night scene or dark light environment, the camera collects multiple frames of images when the shutter is pressed to form an image, finds different pixels with noise properties under different frame numbers, and obtains a relatively clean and pure night scene or dark-light image after weighted synthesis. To put it simply, when a mobile phone photographs a night scene or dark-light environment, the mobile phone calculates and selects noise numbers and positions of multiple frame numbers, and replace positions having noise with noise-free frames. After repeated weighting and replacement, a very clean image is obtained. In fact, the final imaged image is composed of multiple frames of images.

(C) The Jpeg hardware uses the Jpeg image compression algorithm standard to encode the data in the Yuv format obtained through multi-frame noise reduction in the Yuv domain, to obtain Jpeg encoded data, that is, the target image.

Herein, it should be noted that the camera processing unit may include a control logic encapsulation layer related to camera hardware (the image sensor, the ISP or the like), and the control logic encapsulation layer is used to control corresponding hardware to perform corresponding processing actions (data format conversion and data encoding).

Optionally, step 103 of receiving, within the target duration, a second photographing request instruction input by the user specifically includes:

after receiving the first photographing response instruction, receiving, by the camera application program, a second photographing request instruction input by the user.

That is, when the camera application program receives the first photographing response instruction, the camera application program determines that the current photographing process ends, and the next photographing process can be started. Therefore, after the camera application program receives the first photographing response instruction, the camera application program continues to monitor in real time and receive the photographing request instruction input by the user.

Optionally, the first photographing response instruction includes: information indicating that a memory space for storing the target image is empty; or information indicating that the memory space is an invalid memory space.

Herein, it should be noted that an address of the memory space for storing the target image is carried in the first photographing request instruction, and after receiving the first photographing request instruction, the camera processing unit may send, to the camera application program, that the memory space is invalid, so that the camera application program terminates (releases) the current photographing process; or sends an empty memory space (there is no data in the memory space) to the camera application program, so that the camera application program terminates (releases) the current photographing process. If the camera application program is caused to terminate the current photographing process by sending an empty memory space to the camera application program, it should be pre-configured that the camera application program determines that the current photographing process is terminated when an empty memory space is received.

Further, after sending the first photographing response instruction to the camera application program, the method further includes:

sending a preset response instruction to the camera application program in the case that the target image is generated.

Herein, it should be noted that, on the one hand, the preset response instruction carries notification information indicating that the target image has been completed; on the other hand, the preset response instruction may be a preview response instruction.

Herein, it should be noted that during a normal photographing process, the camera application program continuously sends a preview request to the camera processing unit, that is, after the user clicks on the image button, the user can see in real time a preview displayed on the screen of the electronic device. The essence of non-stop of preview is that the camera application program continuously sends requests for preview data (the preview data is actually small-sized Yuv data) to the camera processing unit, and the system returns a preview response message to the camera application program.

Therefore, in this step, when the camera processing unit determines that the target image has been generated, the camera processing unit may send the notification message to the camera application through a preview response instruction, so that the camera application can further obtain the target image.

Furthermore, after the camera processing unit sends a preset response instruction to the camera application program, the method further includes:

sending, by the camera application program, a third photographing request instruction to the camera processing unit; where it should be noted that the third photographing request instruction is a "special" photographing request instruction. The so-called "special" means that the third photographing request instruction is not triggered based on the user's operation, and instead is triggered by a preview response instruction that carries notification information indicating the completion of the target image and that is sent by the camera processing unit.

receiving, by the camera application program, a second photographing response instruction sent by the camera processing unit, where the second photographing response instruction carries the target image; and storing, by the camera application program, the target image to an image database in response to the second photographing response instruction.

That is, after receiving the second photographing request instruction of the user, the camera application program in this embodiment of the present application can receive and save the target image sent by the camera processing unit. In this way, the image processing process in the background is realized, thereby ensuring that on the basis of the better photographing effect, the time for users to take two adjacent photographing operations is shortened, quick photographing is realized, and user experience is improved.

Optionally, after the performing image processing on at least one captured first original image in response to the first photographing request instruction, the method further includes:

storing, by the camera processing unit, the target image in a root directory of a secure digital card (sd card) in the case that the target image is generated; and storing the target image in the image database in the case that the camera application program detects the target image in the root directory of the sd card.

That is, in the embodiment of the present application, after the camera processing unit obtains the target image, the camera processing unit can choose to store the target image in the root directory of the sd card, and the camera application program detects the root directory of the sd card in real time, and after detecting that the directory of the sd card is updated (a new image is generated), updates the database, so that the target image is displayed in the album.

Optionally, the quick photographing method in the embodiment of the present application further includes: if a Raw domain algorithm is used to perform image processing on the at least one first original image, before the performing image processing on the at least one first original image, sending a third photographing response instruction to the camera application program.

Herein, it should be noted that the third photographing response instruction is the same as the first photographing response instruction, both of which are used to instruct the camera application program to terminate the current photographing process. That is, in this embodiment of the application, the performing image processing on the at least one captured first original image in response to the first photographing request instruction may specifically be: firstly, processing the at least one first original image by using a Raw domain algorithm in the camera processing unit; and then, processing the Raw data by using a pre-designed image processing algorithm (conversion of Raw data to Yuv data, multi-frame noise reduction in Yuv domain, conversion of Yuv data after noise reduction to Jpeg encoded data, or the like), to obtain the target image. Therefore, before the Raw domain algorithm is used to process at least one first original image, the third photographing response instruction may be sent to the camera application program, so that the camera application program accepts the photographing request instruction of the user again, thus satisfying parallel operation of image processing and receiving the photographing action of the user. On the basis of ensuring the photographing effect, a time of the user to perform two adjacent photographing operations is shortened, quick photographing is realized, and the photographing experience of the user is improved.

Below, referring to FIG. 2, the implementation process of the photographing method of the embodiment of the present application is described in detail:

Step 201: Click to take a picture. This step can specifically be that the user clicks on a photographing button, and this button can be a physical button or a virtual button.

Step 202: The camera application program delivers a photographing request instruction; this step can specifically be: the camera application program sends a normal photographing request instruction to the camera processing unit in response to the photographing operation of the user (click to take an image in step 201).

Step 203: Output multiple frames of Raw images to the ISP. This step may specifically be: the camera processing unit receives at least one Raw original image captured by the image sensor, and outputs the at least one original image (multiple frames of Raw images) to the ISP.

Step 204: After all the Raw data are output, the camera processing unit sets the camera request instruction as Error and returns this to the camera application program. This step can be specifically: after the camera processing unit determines that all Raw original images for synthesizing the target image are output to the ISP, the camera processing unit sends a photographing response instruction to the camera application program, where the memory space in the photographing request instruction is marked as Error by the photographing response instruction, or the memory space carried in the photographing response instruction is empty. In this case, as the camera application program has received the photographing response instruction, the user can click on the next photographing.

Step 205: The ISP converts the Raw data into Yuv data.

Step 206: Yuv domain multi-frame noise reduction algorithm. This step can specifically be: the camera processing unit uses the Yuv domain multi-frame noise reduction algorithm to process the Yuv data converted in step 205.

Step 207: Perform Jpeg coding on Yuv data. This step can specifically be: the camera processing unit controls the image coder (Jpeg hardware) to perform Jpeg coding on the Yuv data obtained based on the Yuv domain multi-frame noise reduction algorithm, to obtain the target image.

Step 208: Return, to the camera application program in the preview request, a message that Jpeg has been generated. This step can specifically be: sending the preview request carrying a notification message that Jpeg data has been generated to the camera application program.

Step 209: The camera application program sends a special photographing request instruction. This step may specifically be: the camera application program sends a special photographing request instruction to the camera processing unit after receiving the preview request carrying the notification message that the Jpeg data has been generated.

Step 210: The camera processing unit sends the generated Jpeg to the camera application program. This step can be specifically: after the camera processing unit receives the special photographing request instruction, the target image obtained in step 207 is carried in the photographing response instruction and sent to the camera application program.

Step 211: Save the image. This step may specifically be: the camera application program saves the target image and updates the database.

It should be noted that the above embodiment is described by taking the Yuv algorithm as an example, but the embodiment of the present application is not limited to the Yuv algorithm, and may also be a Raw domain algorithm, which is not specifically limited in the present application.

In the photographing method in the embodiments of the present application, firstly, the first photographing request instruction input by the user is received, secondly, image processing is performed on the at least one captured first original image in response to the first photographing request instruction, to obtain the target image; and then, the second photographing request instruction input by the user is received within the target duration, where the target duration is the duration for performing image processing on the at least one first original image. In this way, image processing is performed in the background, so that in each photographing process, image processing occupies a shorter time. Finally, in response to the second photographing request instruction, image processing is performed on the at least one captured second original image. Therefore, in the process of image processing in the background, the next photographing request instruction of the user can be received, which greatly improves the performance of quick photographing and improves the user experience without affecting the effect of pictures.

It should be noted that the execution subject of the photographing method provided in the embodiments of the present application may also be a photographing apparatus, or a control module in the photographing apparatus for executing the photographing method. In the embodiments of the present application, an example in which the photographing apparatus performs the photographing method is used to describe the photographing method provided in the embodiments of the present application.

Figure 3:
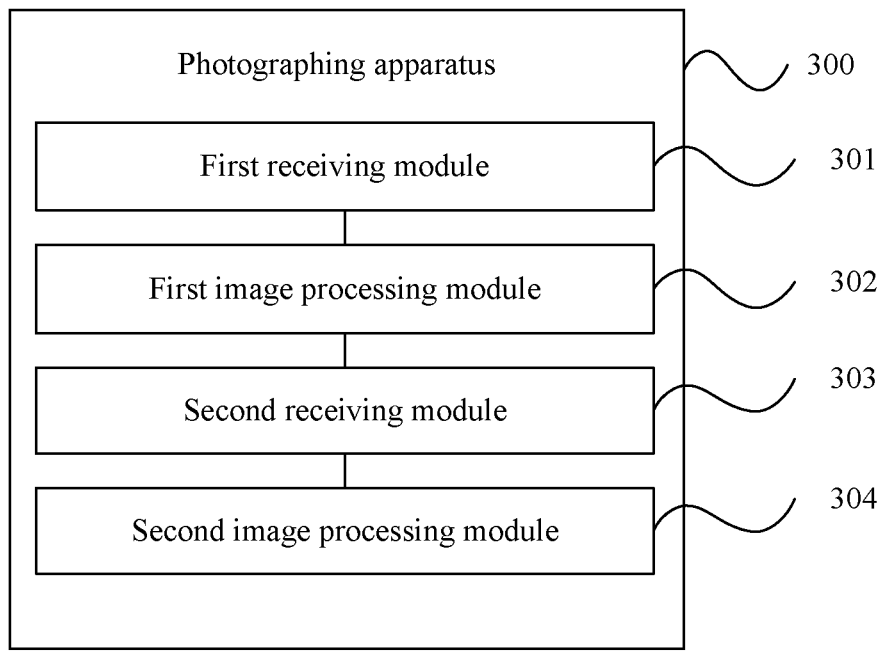
FIG. 3 is a schematic structural diagram of a photographing apparatus of an embodiment of the present application.

FIG. 3 is a schematic structural diagram of a photographing apparatus according to an embodiment of the present application. The photographing apparatus 300 shown in FIG. 3 includes a first receiving module 301, a first image processing module 302, a second receiving module 303, and a second image processing module 304.

The first receiving module 301 is configured to receive a first photographing request instruction input by a user.

The first image processing module 302 is configured to perform image processing on at least one captured first original image in response to the first photographing request instruction.

The second receiving module 303 is configured to receive, within a target duration, a second photographing request instruction input by the user, where the target duration is a duration for performing image processing on the at least one first original image.

The second image processing module 304 is configured to perform image processing on at least one captured second original image in response to the second photographing request instruction.

In the photographing apparatus 300 of the embodiments of the present application, first, the first receiving module 301 receives the first photographing request instruction input by a user; then, the first image processing module 302 performs image processing on at least one captured first original image in response to the first photographing request instruction; then, the second receiving module 303 receives, within a target duration, a second photographing request instruction input by the user, where the target duration is a duration for performing image processing on the at least one first original image; and finally, the second image processing module 304 performs image processing on at least one captured second original image in response to the second photographing request instruction. In this way, when the first image processing module 303 performs image processing in the background, the second receiving module 303 can receive the second photographing request instruction input by the user, that is, image processing and reception of the photographing request instruction input by the user are implemented in parallel. This shortens the time for the user to input the photographing request instruction twice without affecting the image effect, and greatly improves the performance of quick photographing and improving the user experience.

In the photographing apparatus 300 of the present application, the first image processing module 302 includes: a camera processing unit and a camera application program.

The camera processing unit is configured to: send a first photographing response instruction to a camera application program in a case that the at least one first original image is sent to an image signal processor ISP.

The camera processing unit is further configured to: control the ISP to perform image processing on the at least one received first original image. In the photographing apparatus 300 of the embodiments of the present application, the second receiving module is specifically configured to: after the camera application program receives the first photographing response instruction, receive a second photographing request instruction input by the user.

In the photographing apparatus 300 of the embodiments of the present application, the first photographing response instruction includes: information indicating that a memory space for storing the target image is empty; or information indicating that the memory space is an invalid memory space.

In the photographing apparatus 300 of the embodiments of the present application, the camera processing unit is further configured to:

send a preset response instruction to the camera application program in the case that the target image is generated.

In the photographing apparatus 600 of the embodiments of the present application, the camera application program is further configured to:

send a third photographing request instruction to the camera processing unit;

receive a second photographing response instruction sent by the camera processing unit, where the second photographing response instruction carries the target image; and store the target image to an image database in response to the second photographing response instruction.

In the photographing apparatus 300 of the embodiments of the present application, the first image processing module includes: a camera processing unit and a camera application program.

The camera processing unit is configured to store the target image in a root directory of a secure digital card sd card in the case that the target image is generated.

The camera application program is configured to store the target image in the image database in the case that the target image in the root directory of the sd card is detected.

In the photographing apparatus 300 of the embodiments of the present application, the first image processing module includes: a camera processing unit and a camera application program. The camera processing unit is configured to: if a Raw domain algorithm is used to perform image processing on the at least one first original image, before the performing image processing on the at least one first original image, send a third photographing response instruction to the camera application program.

The photographing apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not specifically limited in the embodiments of the present application.

The photographing apparatus in the embodiments of the present application may be an apparatus with an operating system. The operating system may be an Android operating system, an iOS operating system, or another possible operating system. This is not specifically limited in the embodiments of the present application.

Figure 2:
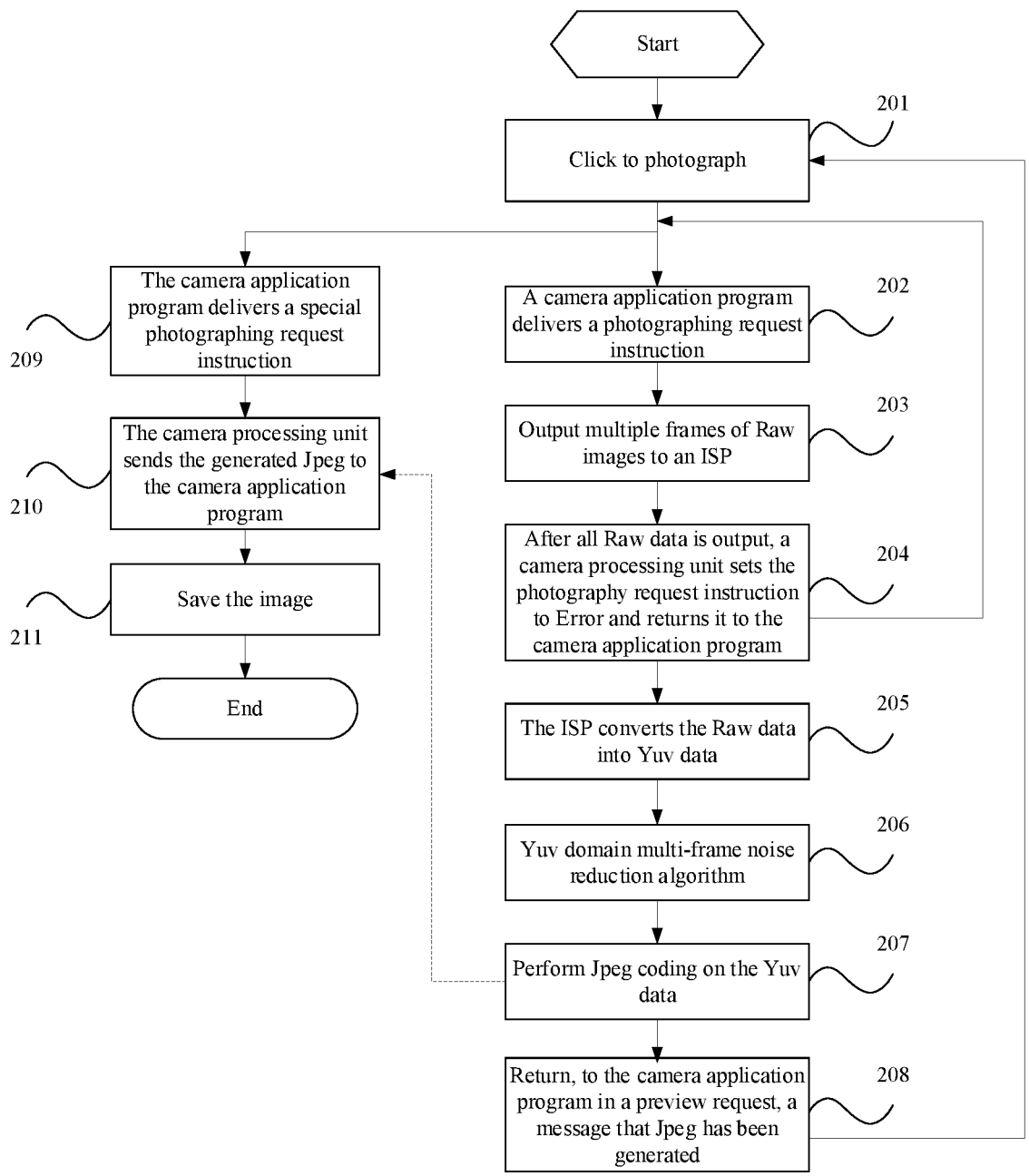
FIG. 2 is a second schematic flowchart of a photographing method of an embodiment of the present application.

The photographing apparatus provided in this embodiment of the present application can implement processes implemented by the photographing apparatus in the method embodiments of FIG. 1 and FIG. 2. To avoid repetition, details are not described herein again.

In the photographing apparatus 300 of the embodiments of the present application, first, the first receiving module 301 receives the first photographing request instruction input by a user; then, the first image processing module 302 performs image processing on at least one captured first original image in response to the first photographing request instruction; then, the second receiving module 303 receives, within a target duration, a second photographing request instruction input by the user, where the target duration is a duration for performing image processing on the at least one first original image; and finally, the second image processing module 304 performs image processing on at least one captured second original image in response to the second photographing request instruction. In this way, when the first image processing module 303 performs image processing in the background, the second receiving module 303 can receive the second photographing request instruction input by the user, that is, image processing and reception of the photographing request instruction input by the user are implemented in parallel. This shortens the time for the user to input the photographing request instruction twice without affecting the image effect, and greatly improves the performance of quick photographing and improving the user experience.

Figure 4:
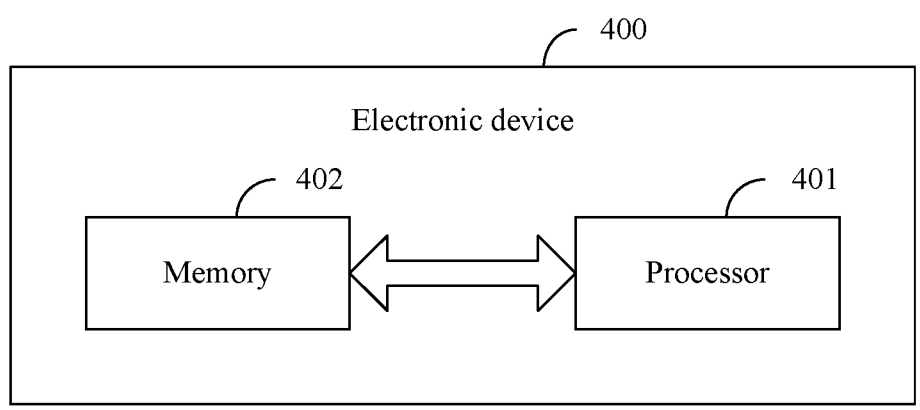
FIG. 4 is a first schematic structural diagram of hardware of an electronic device of an embodiment of the present application.

Optionally, as shown in FIG. 4, the embodiments of the present application further provide an electronic device 400, including a processor 401, a memory 402, and a program or instruction stored in the memory 402 and executable on the processor 401, When the program or instruction is executed by the processor 401, each process of the photographing method embodiment described above can be realized, and the same technical effect can be achieved. To avoid repetition, details are not repeated herein.

It should be noted that the electronic device in this embodiment of the present application includes the foregoing mobile electronic device and the foregoing non-mobile electronic device.

Figure 5:
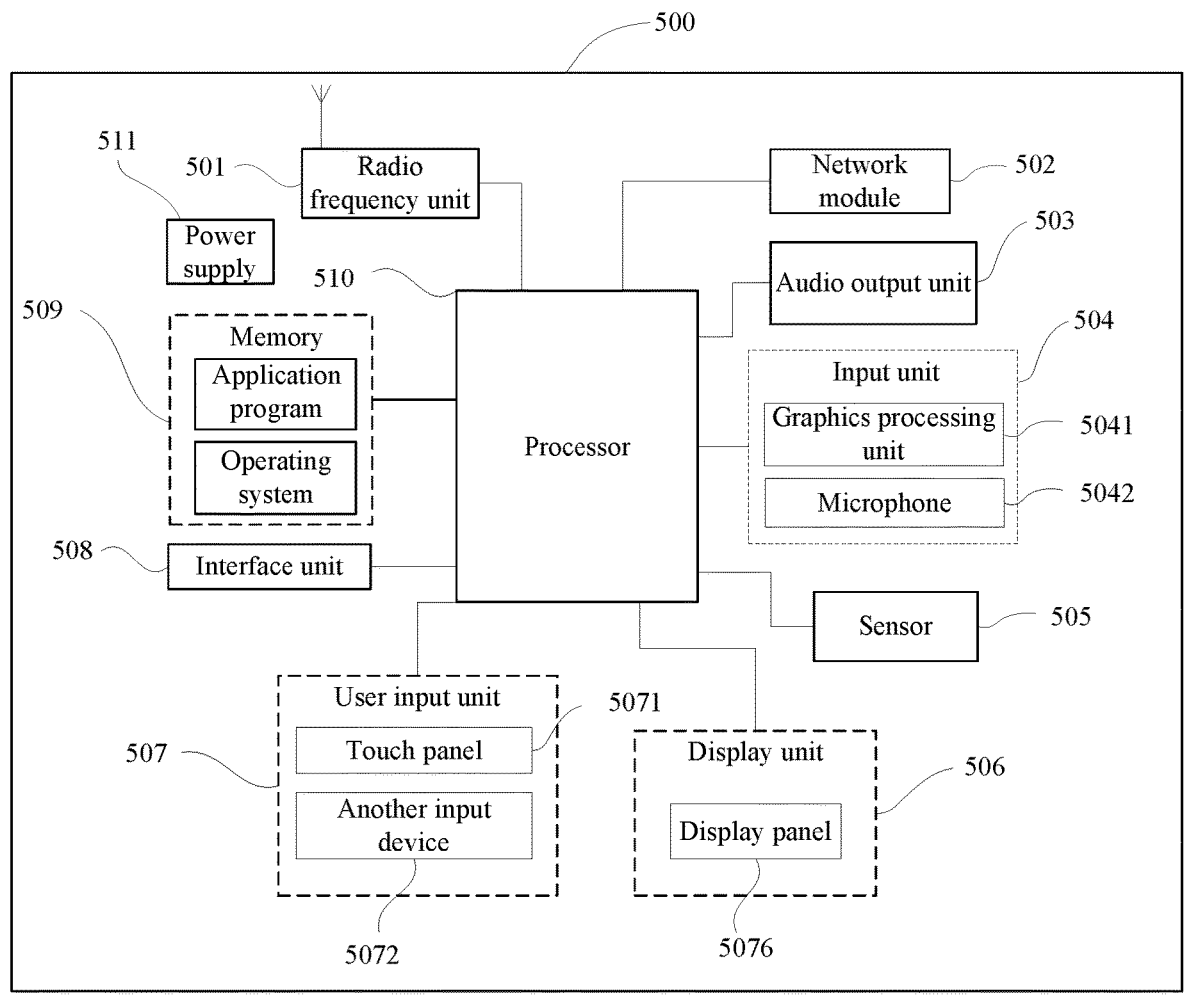
FIG. 5 is a second schematic structural diagram of hardware of an electronic device of an embodiment of the present application.

FIG. 5 is a schematic diagram of a hardware structure of an electronic device for implementing embodiments of the present application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511.

It may be understood by a person skilled in the art that the electronic device 500 may further include a power supply (such as a battery) that supplies power to each component. The power supply may be logically connected to the processor 510 by using a power management system, to implement functions such as charging, discharging, and power consumption management by using the power management system. A structure of the electronic device shown in FIG. 5 does not constitute a limitation on the electronic device, and may include more or fewer parts than those shown in the figure, or combine some components, or have different part arrangements. Details are not described herein again.

The user input unit 507 is configured to receive the first photographing request instruction input by the user.

The processor 510 is configured to perform image processing on at least one captured first original image in response to the first photographing request instruction.

The user input unit 507 is further configured to receive, within a target duration, a second photographing request instruction input by the user, where the target duration is a duration for performing image processing on the at least one first original image.

The processor 510 is configured to perform image processing on at least one captured second original image in response to the second photographing request instruction.

It can be seen that in the electronic device 500, after the user input unit 507 receives the first photographing request instruction input by the user, the processor 510 performs image processing on at least one captured first original image in response to the first photographing request instruction. In the process in which the processor 510 performs image processing on the at least one captured first original image, the user input unit 507 may receive the second photographing request instruction input by the user, and finally, the processor 510 performs image processing on the at least one second original image in response to the second photographing request instruction. In this way, image processing and reception of the photographing request instruction input by the user are implemented in parallel. This shortens the time for the user to input the photographing request instruction twice without affecting the image effect, and greatly improves the performance of quick photographing and improving the user experience.

Optionally, when the processor 510 is configured to perform image processing on at least one captured first original image in response to the first photographing request instruction, the processor 510 is specifically configured to: send a first photographing response instruction to a camera application program in a case that the at least one first original image is sent to an image signal processor ISP; where the first photographing response instruction is used to instruct the camera application program to terminate the current photographing process, and control the ISP to perform image processing on the at least one received first original image.

Optionally, when the user input unit 507 is configured to receive, within the target duration, the second photographing request instruction input by the user, the user input unit 507 is specifically configured to: after the camera application program receives the first photographing response instruction, receive a second photographing request instruction input by the user.

Optionally, the first photographing response instruction includes: information indicating that a memory space for storing the target image is empty; or information indicating that the memory space is an invalid memory space.

Optionally, after the processor 510 is further configured to call the camera processing unit to send the first photographing response instruction to the camera application program, the processor 510 is further configured to schedule the camera processing unit to send a preset response instruction to the camera application program when the target image is generated.

Optionally, after the processor 510 is further configured to invoke the camera processing unit to send a preset response instruction to the camera application program, the processor 510 is further configured to:
 invoke the camera application program to send a third photographing request instruction to the camera processing unit;
 invoke the camera application program to receive a second photographing response instruction sent by the camera processing unit, where the second photographing response instruction carries the target image; and
 invoke the camera application program to store the target image to an image database in response to the second photographing response instruction.

Optionally, after the processor 510 is configured to perform image processing on at least one captured first original image in response to the first photographing request instruction, the processor 510 is configured to: in the case that the target image is generated, invoke the camera processing unit to store the target image in the root directory of the secure digital card sd card; and invoke the camera application program to store the target image in the image database in the case that the target image in the root directory of the sd card is detected.

Optionally, when the processor 510 is configured to perform image processing on the at least one captured first original image, the processor 510 is specifically configured to: if a Raw domain algorithm is used to perform image processing on the at least one first original image, before the performing image processing on the at least one first original image, send a third photographing response instruction to the camera application program.

In the electronic device 500 according to the embodiment of the present application, after the user input unit 507 receives the first photographing request instruction input by the user, the processor 510 performs image processing on at least one captured first original image in response to the first photographing request instruction. In the process in which the processor 510 performs image processing on the at least one captured first original image, the user input unit 507 may receive the second photographing request instruction input by the user, and finally, the processor 510 performs image processing on the at least one second original image in response to the second photographing request instruction. In this way, image processing and reception of the photographing request instruction input by the user are implemented in parallel. This shortens the time for the user to input the photographing request instruction twice without affecting the image effect, and greatly improves the performance of quick photographing and improving the user experience.

It should be understood that, in this embodiment of the present application, the input unit 504 may include a graphics processing unit (GPU) 5041 and a microphone 5042, and the graphics processing unit 5041 processes image data of a still picture or a video obtained by an image capture apparatus (such as a camera) in a video capture mode or an image capture mode. The display unit 506 may include a display panel 5061, and the display panel 5061 may be configured in a form of a liquid crystal display, an organic light emitting diode, or the like. The user input unit 507 includes a touch panel 5071 and another input device 5072. The touch panel 5071 is also referred to as a touchscreen. The touch panel 5081 may include two parts: a touch detection apparatus and a touch controller. The another input device 5072 may include but is not limited to a physical keyboard, a functional button (such as a volume control button or a power on/off button), a trackball, a mouse, and a joystick. Details are not described herein. The memory 509 may be configured to store a software program and various data, including but not limited to an application program and an operating system. The processor 510 may be integrated with an application processor and a modem processor. The application processor mainly processes an operating system, a user interface, an application program, and the like. The modem processor mainly processes wireless communication. It can be understood that, alternatively, the modem processor may not be integrated into the processor 510.

An embodiment of the present application further provides a readable storage medium. The readable storage medium stores a program or an instruction, and when the program or the instruction is executed by a processor, the various processes of the foregoing photographing method embodiment is performed and the same technical effects can be achieved. To avoid repetition, details are not described herein again.

The processor is a processor in the electronic device in the foregoing embodiment. The readable storage medium includes a computer-readable storage medium, such as a read-only memory (ROM), a random access memory (RAM), a magnetic disk, an optical disc, or the like.

An embodiment of the present application further provides a chip, the chip includes a processor and a communication interface, the communication interface is coupled to the processor, and the processor is configured to run programs or instructions to implement each process of the embodiment of the foregoing method and the same technical effects can be achieved. To avoid repetition, details are not described herein again.

It should be understood that the chip mentioned in this embodiment of the present application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of the present application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present application.

The embodiments of the present application are described with reference to the accompanying drawings. However, the present application is not limited to the foregoing specific implementations. The foregoing specific implementations are merely examples, but are not limiting. Under the enlightenment of the present application, a person of ordinary skill in the art may make many forms without departing from the objective and the scope of the claims of the present application, and these forms all fall within the protection scope of the present application.

The invention claimed is:

1. A photographing method, comprising:
receiving a first photographing request instruction input by a user;
performing image processing on at least one captured first original image in response to the first photographing request instruction;
receiving, within a target duration, a second photographing request instruction input by the user, wherein the target duration is a duration for performing image processing on the at least one first original image; and
performing image processing on at least one captured second original image in response to the second photographing request instruction;
wherein after the performing image processing on at least one captured first original image in response to the first photographing request instruction, the method further comprises:
storing, by the camera processing unit, the target image in a root directory of a secure digital card sd card in the case that the target image is generated; and
storing the target image in the image database in the case that the camera application program detects the target image in the root directory of the sd card.

2. The method according to claim 1, wherein the performing image processing on at least one captured first original image in response to the first photographing request instruction comprises:
sending a first photographing response instruction to a camera application program in a case that a camera processing unit sends the at least one first original image to an image signal processor ISP; and
controlling the ISP to perform image processing on the at least one received first original image.

3. The method according to claim 2, wherein the receiving, within a target duration, a second photographing request instruction input by the user specifically comprises:
after receiving the first photographing response instruction, receiving, by the camera application program, a second photographing request instruction input by the user.

4. The method according to claim 2, wherein the first photographing response instruction comprises: information indicating that a memory space for storing the target image is empty; or information indicating that the memory space is an invalid memory space.

5. The method according to claim 2, wherein after the sending a first photographing response instruction to a camera application program, the method further comprises:
sending, by the camera processing unit, a preset response instruction to the camera application program in the case that the target image is generated.

6. The method according to claim 5, wherein after the sending, by the camera processing unit, a preset response instruction to the camera application program, the method further comprises:
sending, by the camera application program, a third photographing request instruction to the camera processing unit;
receiving, by the camera application program, a second photographing response instruction sent by the camera processing unit, wherein the second photographing response instruction carries the target image; and
storing, by the camera application program, the target image to an image database in response to the second photographing response instruction.

7. The method according to claim 1, wherein the method further comprises:
if a Raw domain algorithm is used to perform image processing on the at least one first original image, before the performing image processing on the at least one first original image, sending a third photographing response instruction to the camera application program.

8. An electronic device, comprising a processor, a memory, and a program or instruction stored on the memory and executable on the processor, wherein when the program or instruction is executed by the processor, implements:
receiving a first photographing request instruction input by a user;
performing image processing on at least one captured first original image in response to the first photographing request instruction;
receiving, within a target duration, a second photographing request instruction input by the user, wherein the target duration is a duration for performing image processing on the at least one first original image; and
performing image processing on at least one captured second original image in response to the second photographing request instruction;
wherein after the performing image processing on at least one captured first original image in response to the first photographing request instruction, when the program or instruction is executed by a processor, further implements:
storing, by the camera processing unit, the target image in a root directory of a secure digital card sd card in the case that the target image is generated; and
storing the target image in the image database in the case that the camera application program detects the target image in the root directory of the sd card.

9. The electronic device according to claim 8, wherein the performing image processing on at least one captured first original image in response to the first photographing request instruction comprises:
sending a first photographing response instruction to a camera application program in a case that a camera processing unit sends the at least one first original image to an image signal processor ISP; and
controlling the ISP to perform image processing on the at least one received first original image.

10. The electronic device according to claim 9, wherein the receiving, within a target duration, a second photographing request instruction input by the user specifically comprises:

after receiving the first photographing response instruction, receiving, by the camera application program, a second photographing request instruction input by the user.

11. The electronic device according to claim 9, wherein the first photographing response instruction comprises: information indicating that a memory space for storing the target image is empty; or information indicating that the memory space is an invalid memory space.

12. The electronic device according to claim 9, wherein after the sending a first photographing response instruction to a camera application program, when the program or instruction is executed by a processor, further implements:

sending, by the camera processing unit, a preset response instruction to the camera application program in the case that the target image is generated.

13. The electronic device according to claim 12, wherein after the sending, by the camera processing unit, a preset response instruction to the camera application program, when the program or instruction is executed by a processor, further implements:

sending, by the camera application program, a third photographing request instruction to the camera processing unit;

receiving, by the camera application program, a second photographing response instruction sent by the camera processing unit, wherein the second photographing response instruction carries the target image; and storing, by the camera application program, the target image to an image database in response to the second photographing response instruction.

14. The electronic device according to claim 8, when the program or instruction is executed by a processor, further implements:

if a Raw domain algorithm is used to perform image processing on the at least one first original image, before the performing image processing on the at least one first original image, sending a third photographing response instruction to the camera application program.

15. A non-transitory readable storage medium, storing a program or an instruction, wherein when the program or instruction is executed by a processor, implements:

receiving a first photographing request instruction input by a user;

performing image processing on at least one captured first original image in response to the first photographing request instruction;

receiving, within a target duration, a second photographing request instruction input by the user, wherein the target duration is a duration for performing image processing on the at least one first original image; and performing image processing on at least one captured second original image in response to the second photographing request instruction;

wherein after the performing image processing on at least one captured first original image in response to the first photographing request instruction, when the program or instruction is executed by a processor, further implements:

storing, by the camera processing unit, the target image in a root directory of a secure digital card sd card in the case that the target image is generated; and storing the target image in the image database in the case that the camera application program detects the target image in the root directory of the sd card.

16. The non-transitory readable storage medium according to claim 15, wherein the performing image processing on at least one captured first original image in response to the first photographing request instruction comprises:

sending a first photographing response instruction to a camera application program in a case that a camera processing unit sends the at least one first original image to an image signal processor ISP; and controlling the ISP to perform image processing on the at least one received first original image.

17. The non-transitory readable storage medium according to claim 15, when the program or instruction is executed by a processor, further implements:

if a Raw domain algorithm is used to perform image processing on the at least one first original image, before the performing image processing on the at least one first original image, sending a third photographing response instruction to the camera application program.

* * * * *